Oct. 28, 1958

T. W. KALBOW 2,858,006

WORK FEED DEVICES

Filed May 25, 1955

INVENTOR
T. W. KALBOW
BY C. B. Hamilton
ATTORNEY

United States Patent Office 2,858,006
Patented Oct. 28, 1958

2,858,006

WORK FEED DEVICES

Theodore W. Kalbow, Chicago, Ill., assignor to Western Electric Company, Incorporated, New York, N. Y., a corporation of New York Application May 25, 1955, Serial No. 510,919

7 Claims. (Cl. 198—19)

This invention relates to work feed devices and more particularly to work feed tables for accurately positioning work parts to be fabricated.

An object of this invention is to provide a work feed device for accurately locating work parts in a precise fabricating position.

Another object of this invention is to provide a work feed table driven by a ratchet gear and a pawl which are cammed partially out of engagement to provide clearance therebetween whereby the table can be moved slightly to a final accurate work fabricating position where it is locked.

One embodiment of the present invention may include a work feed table secured to a ratchet gear mounted on a base and driven by a movable ratchet pawl. At the end of the work feed stroke the pawl is cammed partially out of engagement with the ratchet gear to provide clearance therebetween so that the table is free to move slightly, whereupon a pin supported above the base is inserted into a hole in the table to accurately locate it in fabricating position.

Other objects and advantages of the invention will become apparent by reference to the following detailed description thereof and the accompanying drawing illustrating a preferred embodiment of the invention, in which Fig. 1 is a plan view of the device with a portion of the work feed table broken away to show the ratchet pawl in work position and cammed partially out of engagement with the ratchet gear;

Figure 1:
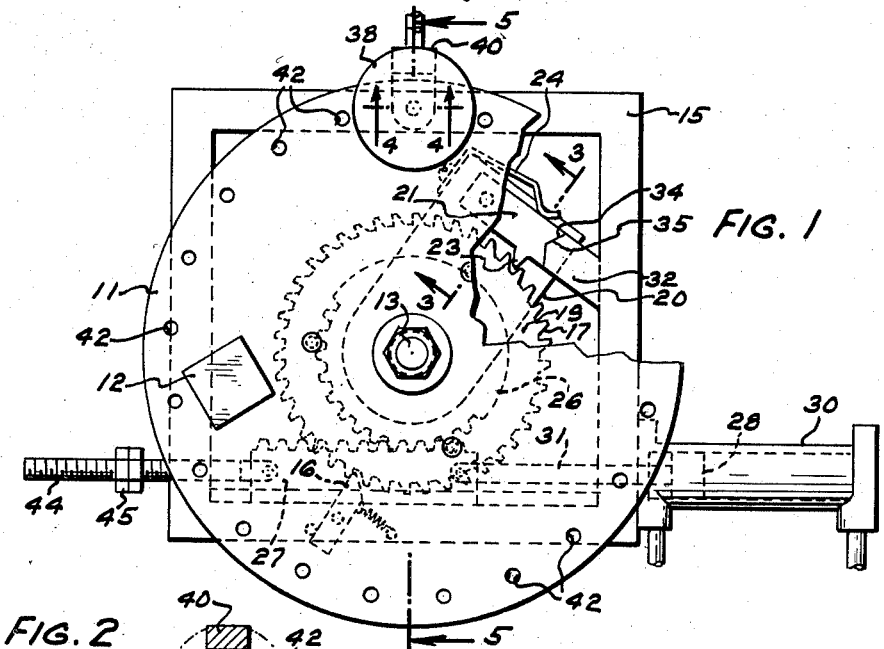
Figure 2:
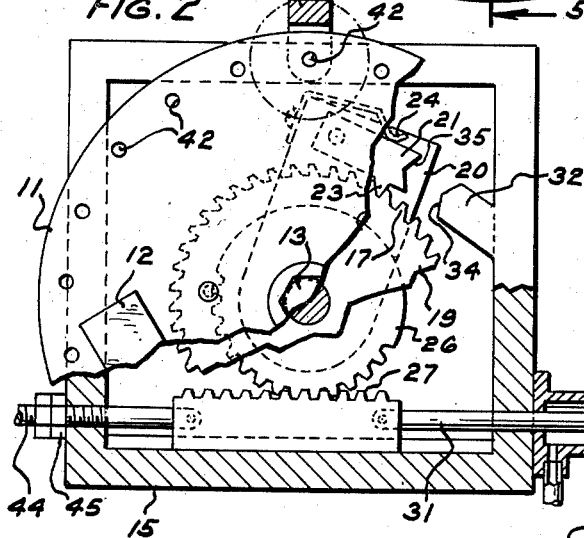
Fig. 2 is a plan view of the device with portions broken away to show the rack holding the pinion and the ratchet pawl in feed position.
Figure 3:
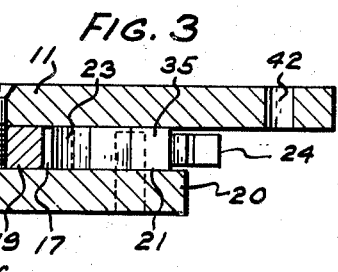
Fig. 3 is an enlarged fragmentary section taken on line 3—3 of Fig. 1 and showing the ratchet pawl cammed partially out of engagement with the ratchet gear.
Figure 4:
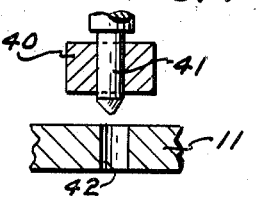
Fig. 4 is an enlarged fragmentary section showing the pin positioned above one of the holes in the table.

Referring now in detail to the drawing, a rotary work table 11 of a well-known type for feeding work parts 12 secured thereon into fabricating position is shown mounted on a shaft 13 which is rigidly secured to a base 15, the work parts 12 being secured to the table 11 in any desirable manner. A spring loaded latching pawl 16 mounted on the base 15 engages teeth 17 of a ratchet gear 19 secured to the lower side of the table 11 to prevent counterclockwise rotation of the table (Figs. 1 and 2). A movable plate 20 mounted on the shaft 13 carries a ratchet pawl 21 having a lug 23 which engages the teeth 17 of the ratchet gear 19 to rotate it clockwise and thus move the table 11 to advance the work part 12 mounted thereon into fabricating position. A spring 24 secured to the plate 20 urges the lug 23 of the ratchet pawl 21 into engagement with the teeth 17 and permits the ratchet pawl 21 to pivot outward against spring pressure to clear the teeth when the plate is moved counterclockwise, the teeth 17 being of such shape whereby they cam the lug 23 outward over the teeth as the plate moves counterclockwise.

A pinion gear 26 mounted on the shaft 13 is secured to the plate 20 for moving it. A rack 27 slidably mounted on the base 15 and connected to a piston 28 of an air cylinder 30 by a rod 31 is meshed with the pinion gear 26 for driving it to move the plate 20 and thus rotate the table 11. When the rack 27 is moved to the right (Figs. 1 and 2) the pinion gear 26 is rotated counterclockwise to move the ratchet pawl 21 into operative feed position as shown in Fig. 2, and when the rack 27 is moved to the left, the pinion gear 26 is rotated clockwise to move the plate 20 and advance the table 11.

A fixed stop 32 having an angular cam surface 34 is secured to the base 15 and engages the ratchet pawl 21 to stop clockwise movement of the table 11 after a predetermined travel. This angular cam surface 34 on the fixed stop 32 engages a complementary notched surface 35 on the end of the ratchet pawl 21 and cams it outward at the end of the feed stroke to move the lug 23 of the pawl partially out of engagement with the teeth 17 of the ratchet gear 19 but not to a position completely disengaged therefrom, thus providing a small amount of clearance between the lug 23 and the teeth 17 of the ratchet gear so that the table 11 will have some free play to be moved slightly to a final accurate work fabricating position.

Figure 5:
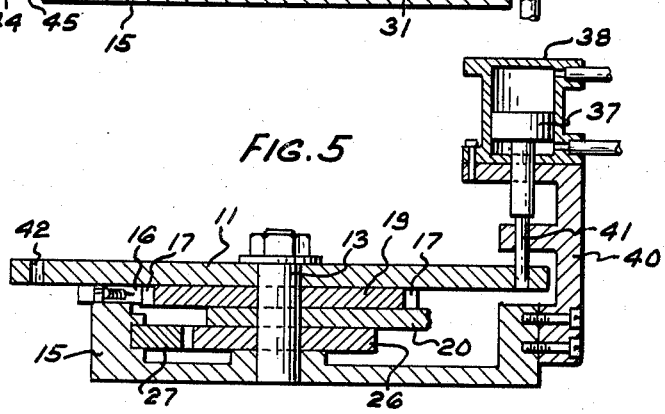
Fig. 5 is a vertical section taken on line 5—5 of Fig. 1 and showing the pin inserted into a hole in the table to accurately position it.

After the ratchet pawl 21 has been cammed outward by the fixed stop 32 to provide some free play between the lug 23 and the teeth 17 on the ratchet gear, a piston 37 of an air cylinder 38 which is mounted on a bracket 40 (Fig. 5) secured to the base 15 carries a tapered pin 41 downward into a predetermined one of a plurality of holes 42 in the table 11 to precisely locate it in fabricating position.

A threaded rod 44 secured to the rack 27 passes through the base 15 and has a pair of lock nuts 45 thereon for adjusting the distance which the rack can move to the right (Figs. 1 and 2), thus adjusting counterclockwise movement of the ratchet pawl 21 and controlling the amount of movement to be made by the work feed table 11 on each feed stroke.

In operating the device, the piston 28 of the air cylinder 30 is actuated to move the rack 27 to the right until it is stopped by abutment of the lock nuts 45 with the base 15, thus moving the plate 20 and the ratchet pawl 21 counterclockwise from fabricating position (Fig. 1) to starting or feed position (Fig. 2). During counterclockwise movement of the plate 20 and the ratchet pawl 21 to fabricating position, the latching pawl 16 prevents counterclockwise rotation of the ratchet gear 19 and the table 11.

The piston of the air cylinder 30 is then actuated to move the rack 27 to the left (Figs. 1 and 2) to move the plate 20 and the ratchet pawl 21 clockwise from the feed position (Fig. 2) to fabricating position (Fig. 1), thus moving the table 11 clockwise to advance the work part 12 into fabricating position. At the end of the feed stroke, the angular cam surface 34 on the fixed stop 32 engages the notched surface 35 on the ratchet pawl 21 and cams it outward to partially disengage the pawl lug 23 from the teeth 17 on the ratchet gear 19 to provide some clearance or free play whereby the table can be moved slightly to locate the work 12 in a final accurate fabricating position. The piston 37 of the air cylinder 38 is then actuated to lower the pin 41 into the aligned hole 42 in the table 11 to lock it in this precise work fabricating position. After the fabricating operation is completed, the air cylinder 38 is actuated to lift the pin 41 whereupon the above procedure is repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a work feeding device, a table for moving work into a precise fabricating position, driving means having an element for engaging the table, said element having thereon a cam surface, stop means having a camming surface thereon for engaging the cam surface on the element of the driving means to limit movement of the table, said stop means also camming outward and partially disengaging the element of the driving means from the table to provide some clearance therebetween whereby the table is free to move slightly, and means for moving the table within said clearance to loacte said table in a final accurate work fabricating position.

2. In a work feeding device, a table for feeding work into a precise fabricating position, a toothed member secured to the table, a movable pawl engaging the toothed member for driving it to move the table, said pawl having on one end thereof a cam surface, means for moving the pawl, stop means for engaging the pawl to limit movement of the table, said stop means having thereon a camming surface for engaging the cam surface on the pawl and partially disengaging the pawl from the toothed member to provide clearance therebetween whereby the table is free to move slightly, and means for moving the table within said clearance to locate it in a final accurate work fabricating position.

3. In a work feeding device, a movable table for feeding work into fabricating position, a toothed member secured to the table, a movable pawl engaging the toothed member for driving it to move the table, said pawl having thereon a cam surface, means for actuating the pawl, means for engaging and stopping the pawl, said means having thereon a camming surface for engaging the cam surface of the pawl and forcing the pawl partially out of engagement with the toothed member to provide clearance therebetween whereby the table can be moved slightly, a tapered pin, and means for supporting and inserting said tapered pin into one of a plurality of recesses in the table to accurately locate and hold said table in a work fabricating position.

4. In a work feeding device, a movable table for feeding work into fabricating position, a ratchet gear secured to the table, a reciprocable pawl engaging the ratchet gear for driving it to move the table, said pawl having thereon a cam surface, means for reciprocating the pawl, said pawl being adapted to advance the table to feed work into fabricating position on alternate strokes, a stop positioned to engage the pawl and having thereon a camming surface for engaging the cam surface on the pawl to force said pawl partially out of engagement with the ratchet gear at the end of each feed stroke to provide some clearance between said pawl and said ratchet gear whereby the table can be moved slightly to a final accurate fabricating position, and means for moving the table to said accurate work fabricating position and locking it.

5. In a work feeding device, a base, a rotary table on the base for feeding work into fabricating position, a ratchet gear secured to the table, a reciprocable pawl engaging the ratchet gear for driving it to move the table, means for reciprocating the pawl, said pawl being adapted to advance the table to feed work on alternate strokes, a stop mounted on the base and having thereon a camming surface for engaging and camming the pawl partially out of engagement with the ratchet gear at the end of a feed stroke to provide some clearance between said ratchet gear and said pawl whereby the table can be moved slightly to a final accurate fabricating position, a tapered pin, and means for supporting the tapered pin and for inserting it into one of a plurality of apertures in the table to accurately locate the table in work fabricating position.

6. In a work feeding device, a base, a rotary table on the base for feeding work into fabricating position, a ratchet gear secured to such a table, a reciprocable pawl engaging the ratchet gear for driving it to move the table, means for actuating the pawl, said pawl being adapted to advance the table to feed work on alternate strokes, means preventing rotation of the table in one direction, a stop mounted on the base and having a camming surface thereon for engaging and camming the pawl partially out of engagement with the ratchet gear at the end of each said feed stroke to provide clearance between said ratchet gear and said pawl whereby the table can be moved into a final accurate fabricating position, means for varying the length of the strokes made by the pawl to vary the distance the work is fed, and means for locating and locking the table in said accurate work fabricating position.

7. In a work feed device, a base, an upright shaft secured to the base, a work-supporting table rotatably mounted on the shaft, a ratchet gear secured to the table for rotation on the shaft, a pinion gear rotatably mounted on the shaft, a plate secured to the pinion gear, a ratchet pawl carried by the plate and engaging and rotating said ratchet gear to rotate the table, said pawl having a cam surface on the end thereof, a rack movably mounted on the base in meshing engagement with the pinion gear, means for moving the rack to rotate the pinion gear, a latching pawl mounted on the base for permitting the ratchet gear and the table to move in only one direction, a stop secured to the base and having thereon a camming surface for engaging the cam surface on the ratchet pawl to pivot and partially disengage said ratchet pawl from the ratchet gear, and means for locating and locking the table in work position when the ratchet pawl is partially disengaged from the ratchet gear.

References Cited in the file of this patent

UNITED STATES PATENTS

| | | |
|---|---|---|
| 1,578,232 | Ferris | Mar. 23, 1926 |
| 2,262,103 | Laessker | Nov. 11, 1941 |
| 2,664,791 | Powell | Jan. 5, 1954 |
| 2,672,773 | Schofield | Mar. 23, 1954 |